United States Patent [19]
Warnken

[11] 4,212,290
[45] Jul. 15, 1980

[54] SOLAR COLLECTOR

[76] Inventor: Warren L. Warnken, R.R. #2, Box 316 13225 Cheyenne Ct., Pine, Colo. 80470

[21] Appl. No.: 884,626

[22] Filed: Mar. 6, 1978

[51] Int. Cl.² ............................................. F24J 3/02
[52] U.S. Cl. ................................... 126/438; 126/446
[58] Field of Search ..................... 126/270, 271, 438

[56] References Cited
U.S. PATENT DOCUMENTS

| | | | |
|---|---|---|---|
| 3,254,644 | 6/1966 | Thannhauser | 126/271 |
| 3,866,285 | 2/1975 | Clark | 126/271 |
| 3,998,205 | 12/1976 | Scragg et al. | 126/271 |
| 4,029,077 | 6/1977 | Gorniak | 126/271 |
| 4,148,300 | 4/1979 | Kaufman | 126/271 |

*Primary Examiner*—Carroll B. Dority, Jr.
*Attorney, Agent, or Firm*—Clarence A. O'Brien; Harvey B. Jacobson

[57] ABSTRACT

A solar collector has a body member in the form of an inverted frustum of a cone provided with an upwardly opening recess. A light absorbing layer conformingly covers the frustoconical surface of the recess, with a tube being coiled so as to spiral along the light absorbing layer and permit a heat transfer fluid medium to be passed through the recess. Solar radiation impinging on the body member is dispersed throughout the recess by a reflective cone, the base of which abuts the smaller base of the body member and extends upwardly toward the open top of the recess, while the top of the recess is enclosed with a transparent or translucent cover in order to retain heat energy within the recess of the body member. The body member itself is constructed from a thermally insulating material.

8 Claims, 2 Drawing Figures

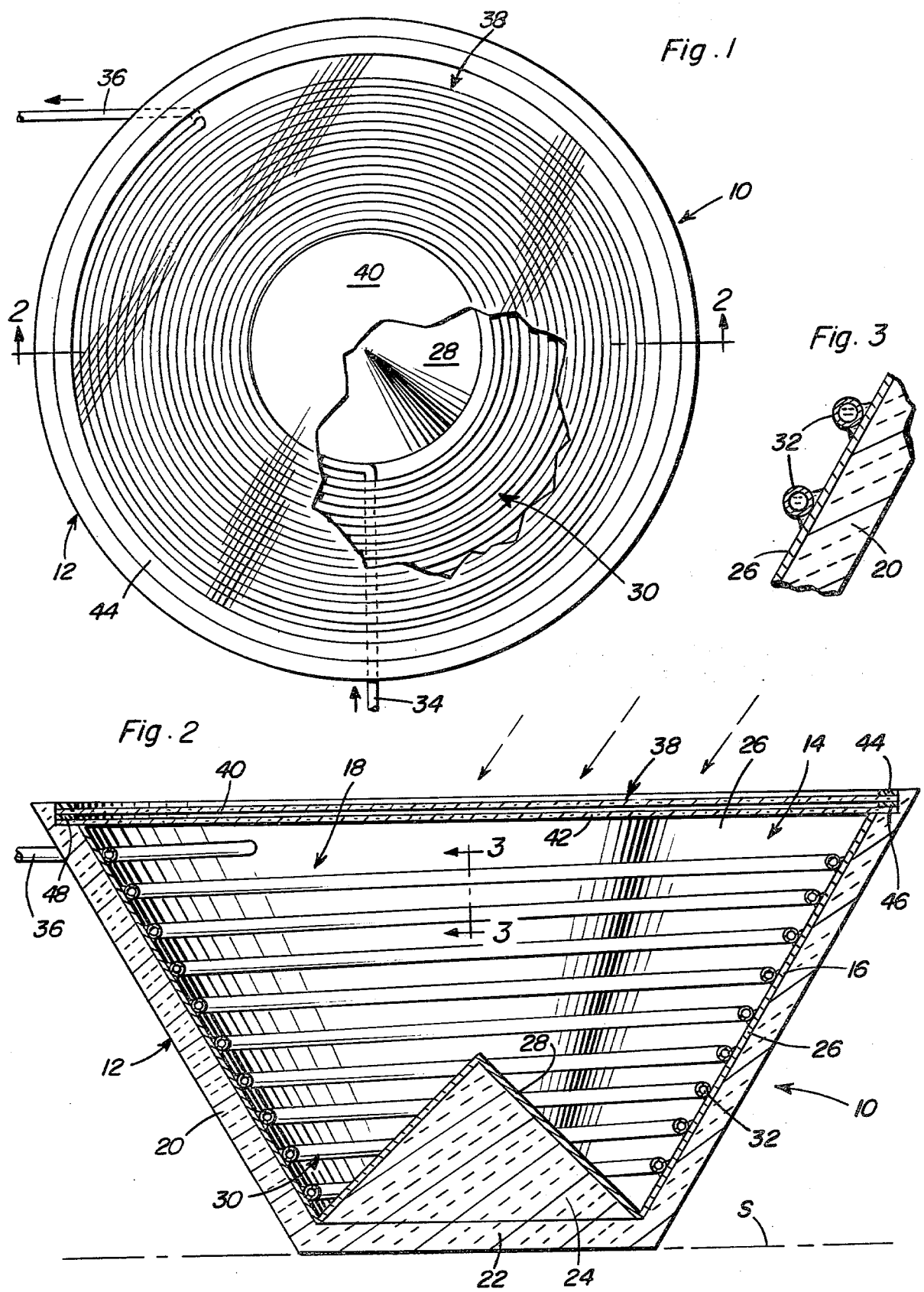

SOLAR COLLECTOR

BACKGROUND OF THE INVENTION

1. Field of the Invention

This invention relates generally to a solar collector, and particularly to a solar collector of compact and highly efficient construction.

2. Description of the Prior Art

A basic problem encountered with the collection of solar energy is the surface areas which the collectors must occupy in order to collect sufficient energy to perform residential heating and similar functions. Various collector constructions have been proposed in order to decrease the required surface area, while simultaneously making the heat transfer operation more efficient.

U.S. Pat. No. 3,254,644, issued June 7, 1966, to F. G. Thannhauser, discloses a thermosyphon solar heat cell formed by a coil in the configuration of an inverted frustum of a cone, while U.S. Pat. No. 3,998,205, issued Dec. 21, 1976, to R. L. Scragg, et al., discloses a solar reactor steam generator method and apparatus which employs a conical reflector in the bottom thereof to insure good distribution of radiation to an associated collector coil.

U.S. Pat. No. 4,014,314, issued Mar. 29, 1977, to T. L. Newton, discloses a solar energy collector panel constructed around a coil in the form of a flat spiral, while U.S. Pat. No. 4,029,077, issued June 14, 1977, to J. Gorniak, discloses a solar energy collector constructed around an inverted pyramid.

SUMMARY OF THE INVENTION

It is an object of the present invention to provide a solar collector of compact and highly efficient construction when compared to conventional solar collectors.

It is another object of the present invention to provide a solar collector which acts to retain heat therein for more efficient operation.

Yet another object of the present invention is to provide a solar collector which disperses impinging solar radiation in a highly efficient manner in order to enhance the heat transfer process within the collector.

These and other objects are achieved according to the present invention by providing a solar collector having: a body member provided with an upwardly opening recess; a heat exchanger arrangement disposed in the recess for receiving radiation and heating a fluid medium contained in the heat exchanger arrangement; and a reflective device arranged in the recess for distributing solar radiation evenly inside the recess and onto the heat exchanger arrangement.

Preferably, the body member is in the form of a hollow, inverted frustum of a cone, with a frusto-conical inner surface of a side wall of the body member forming the recess. Advantageously, the body member is constructed from a foamed material, and the like, having good thermal insulative properties.

The heat exchange arrangement preferably includes a hollow tube formed into a spiral coil arranged conforming to the frusto-conical inner surface of the body member. Further, the arrangement includes a layer of reflective material arranged in the recess and substantially conforming to the inner surface of the body member, and being disposed between the coil of the transfer device and the inner surface of the body member.

A reflective arrangement advantageously includes a conical layer constructed from a reflective material and arranged in the bottom of the recess so as to converge to a point upwardly toward the opening of the of the recess. The body member preferably includes a cone having a base and constructed from a material having similar thermal properties as the portion of the body member formed as a frustum of a cone, with the base of the cone abutting that portion of the inner surface of the body member which is formed by the frustum, the cone being thus arranged to support the conical layer of the reflective arrangement.

The body member preferably further includes a cover arranged blocking the opening of the recess, with the cover being constructed from a transparent or translucent material which permits light rays to pass therethrough and into the recess of the body member.

These together with other objects and advantages which will become subsequently apparent reside in the details of construction and operation as more fully hereinafter described and claimed, reference being had to the accompanying drawing forming a part hereof, wherein like numerals refer to like parts throughout.

BRIEF DESCRIPTION OF THE DRAWING

FIG. 1 is a fragmentary, schematic, top plan view, partly broken away to expose interior elements, of a solar collector according to the present invention.

FIG. 2 is an enlarged, fragmentary, sectional view taken generally along the line 2—2 of FIG. 1.

FIG. 3 is an enlarged, fragmentary, sectional view taken generally along the line 3—3 of FIG. 2.

DESCRIPTION OF THE PREFERRED EMBODIMENTS

Referring now more particularly to the figures of the drawing, a solar collector 10 according to the present invention includes a body member 12 provided with an upwardly opening recess 14. Heat exchange arrangement 16 is disposed in recess 14 for absorbing solar radiation, and the like, impinging on body member 12, and transferring heat thus collected to a fluid medium. A reflective device 18 is arranged in recess 14 for receiving radiation impinging on body member 12 and distributing same to the heat exchange arrangement 16 for showing an even distribution of heat throughout recess 14.

Body member 12 is in the form of a hollow, inverted frustum of a cone having a frusto-conical side wall 20 the inner surface of which partially forms recess 14 in cooperation with the inwardly facing surface of a base 22 of body member 12. Base 22 also has an outwardly facing surface which permits body member 12 to rest on a generally planar surface S as seen in FIG. 2. Body member 12 is constructed from a foamed material, and the like, having good thermal insulative properties. An example of such a material is polyurethane.

Body member 12 further includes a cone 24 having a base and constructed from a material having similar thermal properties, and preferably the same material, as that from which the frustum of a cone portion of body member 12 is constructed. This cone 24 is arranged in recess 14 with the base thereof abutting the smaller base 22 of the frusto-conical inner surface of body member 12 so as to converge upwardly toward the top opening of recess 14.

Heat exchange arrangement 16 includes a frusto-conical layer 26 constructed from sheet metal, and the like, and covered on its exposed surface with black paint, and the like. This layer 26 is arranged conformingly within recess 14 so as to cover the inner surface of the side wall 20 of body member 12, while the reflective device 18 is formed in a similar manner by a sheet of metal polished on its exposed surface and arranged so as to conform to and be supported by the cone 24.

Heat exchange arrangement 16 further includes a hollow tube formed into a spiral coil 30 conforming to and supported by layer 26. More specifically, coil 30 includes a plurality of turns 32 of varying diameters which are attached to side wall 20 in a suitable manner, such as by welding or brazing. The tube forms coil 30, and which is preferably constructed from copper, brass, and the like, terminates in a pair of ends 34 and 36 which permit collector 10 to be inserted into a residential heating system (not shown), and the like.

A cover 38 is arranged at the open top of recess 14 so as to block same. As illustrated, cover 38 comprises a pair of substantially parallel transparent or translucent sheets 40 and 42 mounted on body member 12 at the opening of recess 14 as by the illustrated seals 44 and 46. While double glazing is illustrated, it is to be understood that such is only required in colder climates, and that only single glazing is required in most geographical areas. The sheets 40 and 42 may be constructed from conventional materials, such as glass, acrylate, and the like, and are supported on an annular lip 48 formed in the upper portion of side wall 20 abutting body member 12.

In operation, a liquid is pumped into the upper end, or larger base, of the frusto-conical side wall 20 at end 34 of coil 30. The fluid will pass through the turns 32 of coil 30 and exit through end 36 of coil 30, having absorbed heat from the frust-conical layer 26 and from the coil 30 itself. Heat is directed onto the layer 26 and turns 32 of coil 30 by the conical reflective layer 28 disposed in the bottom of recess 14. Cover 38 allows the solar radiation to enter recess 14 while simultaneously assisting in the elimination of heat losses from collector 10.

As can be readily understood from the above description and from the drawing, a solar collector according to the present invention will provide for efficient heat transfer in a compact unit which effectively provides greater heat transfer area than conventional solar collectors currently on the market.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar collector, comprising, in combination:
    (a) a body member provided with an upwardly opening recess, said recess having a frust-conical inner surface;
    (b) heat exchanger means arranged on the surface for receiving radiation and heating a fluid medium contained in the heat exchanger means;
    (c) reflector means arranged in the recess for distributing impinging solar radiation to the heat exchanger means;
    said reflector means comprising a conical surface formed in a bottom portion of the recess and arranged converging to a point upwardly toward the opening of the recess, said conical surface being reflective to reflect impinging radiation evenly onto the inner surface of said recess and said heat exchanger means.

2. A structure as defined in claim 1, wherein the body member is constructed from a foamed material having good thermal insulative properties.

3. A structure as defined in claim 1, wherein the heat exchanger means includes a hollow tube formed into a spiral coil conforming to and supported by the inner surface of the body member.

4. A structure as defined in claim 3, wherein the heat exchanger means further includes a layer of light absorbing material arranged in the recess in substantial conformance with the frusto-conical inner surface of the body member.

5. A structure as defined in claim 4, wherein the body member is constructed from a foamed material having good thermal insulative properties, and the body member further includes a cone having a base constructed from a material having similar thermal properties as the remainder of the body member, with the cone being arranged in the recess with the base of the cone abutting the bottom portion of the recess, with the conical surface being formed on and covering the cone.

6. A structure as defined in claim 5, wherein the heat exchanger means includes a hollow tube formed into a spiral coil conforming to and supported by the inner surface of the body member.

7. A structure as defined in claim 5, wherein the body member further includes a cover arranged blocking the opening of the recess, with the cover constructed from a material which permits light rays to pass therethrough.

8. A structure as defined in claim 1, wherein the body member further includes a cover arranged blocking the opening of the recess, with the cover being constructed from a material which permits light rays to pass therethrough.

* * * * *